(No Model.)
C. HOUSTON & W. A. MACKIE.
CIRCULATION OF WATER IN FISH WELLS.
No. 471,501. Patented Mar. 22, 1892.
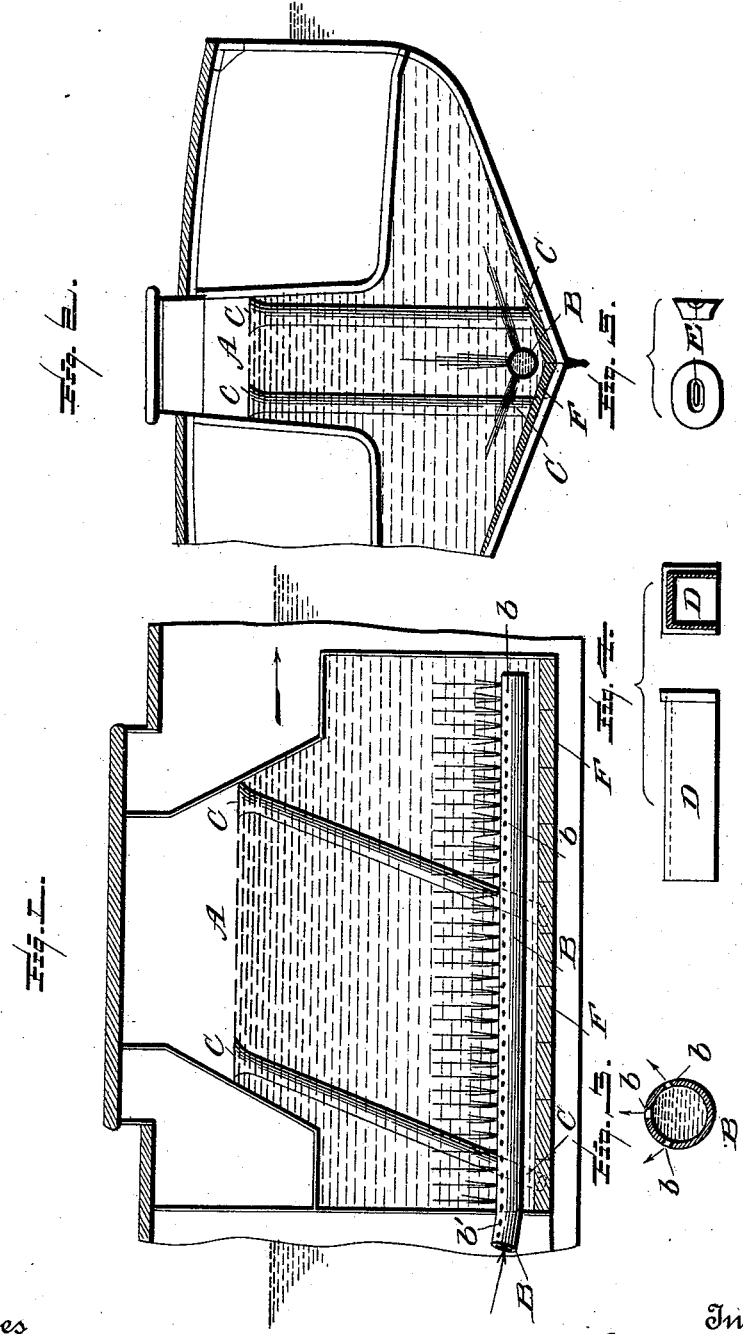

United States Patent Office.

COLIN HOUSTON AND WILLIAM ARBUCKLE MACKIE, OF GLASGOW, SCOTLAND.

CIRCULATION OF WATER IN FISH-WELLS.

SPECIFICATION forming part of Letters Patent No. 471,501, dated March 22, 1892.

Application filed December 8, 1891. Serial No. 414,442. (No model.) Patented in England October 9, 1891, No. 17,186.

*To all whom it may concern:*

Be it known that we, COLIN HOUSTON, engineer, of the firm of Muir & Houston, engineers and boiler-makers, and WILLIAM ARBUCKLE MACKIE, engineer, both of 60 Portman Street, Kinning Park, Glasgow, in the county of Renfrew, Scotland, have invented Improvements in the Circulation of the Water in the Fish-Wells or Fish-Tanks of Fishing-Vessels and in the Apparatus Employed Therefor, (for which we have obtained Letters Patent of Great Britain, No. 17,186, dated October 9, 1891,) of which the following is a specification.

This invention, which relates to improvements in the circulation of the water in the fish-wells or fish-tanks of fishing-vessels and in the apparatus employed therefor, has for its object to provide a fish well or tank with means whereby the water is properly circulated and aerated for the purpose of enabling fish to be carried alive from where they have been captured to a harbor or market, whether the same be on the coast or up a river.

In carrying out our said invention we use what is known as a "dry-well" fishing-vessel, which may be a steam or sailing vessel, and we employ a series of one or more lengths of perforated supply-pipes preferably arranged near the bottom of the dry well and connected at their one end to a circulating or other pump or pumps, which may be driven by the main engine, donkey-engine, or otherwise, as desired, there being a suitable two-way cock provided on said pipes outside the dry well. Owing to the said pipes being arranged at the bottom of the well they cause a continual supply and circulation of water in an upward direction and so thoroughly aerate the water as well as cause all the scum to be sent to the top, from whence, along with the used water, it escapes back to the sea by means of, preferably, four or more bell-mouthed or other shaped overflow-pipes, which have their lower ends passing through the vessel's bottom, and they are preferably mounted so as to incline aft and so allow the force from the forward movement of the vessel to suck them clear; also, in accordance with our invention we employ suitable covers and plugs for the perforated supply-pipes and overflow-pipes, by the use of which the dry well may be used as a coal-bunker on the outward voyage, and therefore permit of the vessels taking longer voyages.

In the drawings, Figure 1 is a sectional elevation of a part of a fishing-vessel, showing the well or tank and our arrangement of pipes. Fig. 2 is a transverse section of same on line X Y, and Figs. 3, 4, and 5 details.

Referring to the said drawings, we arrange within and preferably near the bottom of the well or tank A a series of one or more lengths of perforated supply-pipes B, preferably having their perforations $b$ formed in three rows, (as shown more particularly in Fig. 3,) so as to cause a continual supply and circulation of the water in an upward direction throughout the whole of the well or tank A. The said upward direction of the supply not only causes the water to be thoroughly aerated, but it tends to carry all the scum and refuse to the top of the well or tank A, from whence, along with the used water, it passes to the sea through the medium of, preferably, four or more bell-mouthed or other shaped overflow-pipes C. The said pipes C are mounted in such a manner as to incline aft, and their lower ends are caused to pass through the bottom of the vessel and so cause the force from the forward movement of the vessel to suck the said pipes C clear. The circulation of the water throughout the perforated pipes B is obtained by suitably connecting the end $b'$ to a circulating pump or pumps, which may be placed in any convenient part of the vessel and driven by the main engine, donkey-engine, or otherwise, as desired. The said connecting-pipe is provided at any convenient part with a suitable two-way cock or valve, so as to enable the well or tank A being emptied of water when desired.

In order to enable the well or tank A to be used as a coal-bunker on the outward journey, we provide wooden or other covers D, Fig. 4, for the pipes B, which are preferably made in sections for convenience, and we also provide wooden plugs or covers E, Fig. 5, for the top ends of the overflow-pipes. The whole arrangement is such that on a vessel going to the fishing-ground the pipes B and C are covered by their covers D and plugs E and the well A filled with coal. After the vessel has arrived at its fishing-ground the coal is removed to the ordinary bunkers, which are by this time empty. The well is then cleaned out very easily, owing to its being lined with a cement or concrete lining or flooring F, and the circulation of the water started and kept up until the vessel has obtained her cargo of fish and also during her homeward journey until the vessel comes into impure or different water, when the circulation is stopped and the well left full of sea or pure water, thus enabling the boat to sail into harbor with her cargo alive. On reaching the harbor the two-way cock on the supply-pipe is manipulated so as to empty the well and thus enable the fish to be easily unshipped at once.

Our said invention is also applicable to vessels having fish-wells with two or more hatches and to fish-wells in which there is a divisional bulk-head provided, the said bulk-head being preferably perforated, so as to insure of a more equal circulation of water throughout the two compartments, each of the compartments being provided with one or more lengths of perforated supply-pipes.

We claim—

1. In a vessel having a well or tank, as described, the combination of a series of one or more lengths of supply-pipes perforated substantially as described and located within and near the bottom of said well or tank and communicating with the exterior of the vessel near its bottom and outlet or overflow pipes extending upwardly above the supply-pipes and having their lower ends passing through the bottom of the vessel, substantially as set forth.

2. In a vessel, the combination of a well or tank, a series of one or more lengths of supply-pipes perforated substantially as described and located within and near the bottom of said well or tank and extending through the wall of said vessel near its bottom to permit the inward flow of water, outlet or overflow pipes extending upwardly above the supply-pipes and having their lower ends communicating with the outside of the vessel, a removable cover adapted to fit over said supply-pipes to close the perforations, and a removable plug to close the openings in the upper ends of the overflow-pipes, as set forth.

3. In a vessel, the combination of a well or tank, supply-pipes, perforated substantially as described, located near the bottom of said well or tank, and outlet or overflow pipes mounted to incline aft, as described, and extending upwardly above the supply-pipes and having their lower ends passing through the bottom of the vessel to permit free exit of water from the interior of the vessel, substantially as described.

4. In a vessel having a well or tank, the combination of a series of one or more supply-pipes, perforated substantially as described, located near the bottom of said well or tank, outlet or overflow pipes mounted to incline aft, as described, and extending upwardly above the supply pipe or pipes and having their lower ends passing through the bottom of the vessel, a removable cover adapted to fit over said supply pipe or pipes and close the same, and a removable plug or stopper to close the mouths of the overflow-pipes, as set forth.

In testimony whereof we have signed our names to this specification in the presence of two subscribing witnesses.

COLIN HOUSTON.
WILLIAM ARBUCKLE MACKIE.

Witnesses:
WILLIAM CASSELS RENNIE,
*Clerk, 135 Sydney Street, Glasgow.*
JAMES YATE JOHNSON,
*Chartered Patent Agent, 115 St. Vincent Street, Glasgow.*